(12) United States Patent
Kiest

(10) Patent No.: US 7,096,802 B1
(45) Date of Patent: Aug. 29, 2006

(54) ANHYDROUS AMMONIA FERTILIZER FLOW CONTROL APPARATUS AND METHOD

(76) Inventor: Lauren J. Kiest, 2224 Maine St., Quincy, IL (US) 62301-4349

( * ) Notice: Subject to any disclaimer, the term of this patent is extended or adjusted under 35 U.S.C. 154(b) by 0 days.

(21) Appl. No.: 10/825,638

(22) Filed: Apr. 15, 2004

Related U.S. Application Data

(60) Provisional application No. 60/462,844, filed on Apr. 15, 2003.

(51) Int. Cl.
*A01C 23/00* (2006.01)

(52) U.S. Cl. ............... 111/119; 111/121; 111/900; 111/925

(58) Field of Classification Search ........ 111/118–129, 111/900, 925; 239/1, 8–11, 77, 78, 650, 239/661–664, 146–176, 722–754, 337–373, 239/569–574
See application file for complete search history.

(56) References Cited

U.S. PATENT DOCUMENTS

| | | | |
|---|---|---|---|
| 3,556,027 A | 1/1971 | Ammann | |
| 3,947,574 A | 3/1976 | Jaggers et al. | |
| 3,950,401 A | 4/1976 | Petrille et al. | |
| 3,954,942 A | 5/1976 | Achorn et al. | |
| 3,978,681 A | 9/1976 | Kjelgaard et al. | |
| 3,990,662 A | 11/1976 | Wallace | |
| 4,069,029 A | 1/1978 | Hudson | |
| 4,169,677 A | 10/1979 | Luria | |
| 4,175,394 A | 11/1979 | Wiesboeck | |
| 4,202,283 A | 5/1980 | Wiesboeck | |
| 4,310,344 A | 1/1982 | Kjelgaard et al. | |
| 4,310,555 A | 1/1982 | Kjelgaard et al. | |
| 4,341,168 A | 7/1982 | Siebert | |
| 4,385,500 A | 5/1983 | Kjelgaard et al. | |
| 4,458,609 A | 7/1984 | Tofte | |
| 4,657,568 A | 4/1987 | Jones | |
| 4,900,339 A | 2/1990 | Ward et al. | |
| 5,845,592 A | 12/1998 | Ridgley | |
| 5,967,066 A | 10/1999 | Giles et al. | |
| 6,117,217 A | 9/2000 | Jones | |
| 6,142,177 A | 11/2000 | Jones | |
| 6,269,757 B1 | 8/2001 | Kiest | |
| 6,283,049 B1 | 9/2001 | Swanson | |
| 6,283,079 B1 | 9/2001 | Cumming et al. | |

*Primary Examiner*—Christopher J. Novosad
(74) *Attorney, Agent, or Firm*—Robert L. Farris

(57) ABSTRACT

A method and apparatus for supplying liquid anhydrous ammonia to a pump or other flow control system whereby a separation chamber removes vapor generated by friction in the flow path from a storage tank containing saturated anhydrous ammonia. Additionally, liquid ammonia in the separation chamber creates a static head pressure. The difference in height between the inlet near the top of the separation chamber and the outlet at the bottom causes the static head pressure. The static head assures pure liquid at the bottom since absolute pressure exceeds saturation pressure. As a result, the feed stream to the pump or other flow control system is free of ammonia vapor.

11 Claims, 4 Drawing Sheets

ANHYDROUS AMMONIA FERTILIZER FLOW CONTROL APPARATUS AND METHOD

CROSS REFERENCE TO RELATED APPLICATIONS

This application claims the benefit of the filing date of U.S. Provisional Application No. 60/462,844, titled "Method and Apparatus for Supplying Liquid Anhydrous Ammonia To A Flow Control System," filed Apr. 15, 2003.

FIELD OF THE INVENTION

The present invention relates to a new apparatus and method for providing vapor free liquid to an anhydrous ammonia flow control system. More particularly, the invention relates to a process which removes gaseous ammonia from the liquid stream and provides a static head pressure differential at the inlet of the flow control system. The static head causes anhydrous ammonia at the inlet to have an absolute pressure above its saturation pressure.

BACKGROUND OF THE INVENTION

Injection of anhydrous ammonia into the soil is a commonly used method of supplying nitrogen fertilizer to grain and other crops using an applicator-vehicle pulled by a tractor. An ammonia storage tank is pulled behind the applicator. A hose connects the storage tank to the distribution system on the applicator. The distribution system splits the ammonia into separate lines which feed several knives. These knives are lowered into the soil several inches and ammonia is injected into the ground at the bottom of the knives as the knives are pulled through the soil.

It is normally desired that ammonia be applied uniformly over a field. One of the main problems is achieving this uniformity is difficulty in controlling a stream of mixed liquid and gaseous ammonia. Gaseous ammonia causes many flow sensors to supply incorrect data and causes many pump designs to become vapor locked. Refrigeration of the ammonia and pressurizing with a pump are methods of keeping liquid anhydrous ammonia below its saturation temperature.

A typical use of refrigeration is described in U.S. Pat. No. 4,458,609 to Tofte. A part of the liquid ammonia is used as a refrigerant to cool the inlet liquid stream. This is accomplished in a heat exchanger which mechanically separates the stream of inlet liquid ammonia from a stream of coolant ammonia. Typically, the coolant stream taken from the main stream passes through a restriction, losing pressure. The lower pressure, lower temperature stream provides the cooling for the inlet liquid ammonia.

Another method of cooling the liquid ammonia stream is the use of an externally powered refrigeration system, described in U.S. Pat. No. 6,269,757 to Kiest.

Pressurization of liquid ammonia for agricultural application is typically described in U.S. Pat. No. 5,845,592 to Ridgley and U.S. Pat. No. 6,283,079 to Swanson.

This invention relies on separation of gaseous ammonia from the liquid ammonia flow stream. Prior patents cover the separation of the gaseous phase for agricultural use. However, their methods and purposes are quite different from this invention. A typical example is U.S. Pat. No. 4,069,029 to Hudson which discusses the adiabatic expansion of anhydrous ammonia in an expansion chamber. This expansion creates a significant amount of gaseous ammonia. The gas and liquid are separated and utilized at relatively low pressures, generally close to ambient. The resulting liquid remains in a saturated state so that subsequent pressure drops create more gaseous ammonia. This approach is not useful as a method of feeding pumps or other flow control systems. Other similar patents are U.S. Pat. No. 3,978,681 to Kjelgaard et al, U.S. Pat. No. 4,175,394 to Wiesboeck, U.S. Pat. No. 4,169,677 to Luria, U.S. Pat. No. 4,202,283 to Wiesboeck, U.S. Pat. No. 4,310,344 to Kjelgaard et al, U.S. Pat. No. 4,310,555 to Kjelgaard et al, U.S. Pat. No. 4,341,168 to Siebert, U.S. Pat. No. 4,385,500 to Kjelgaard et al, U.S. Pat. No. 4,657,568 to Jones and U.S. Pat. No. 4,900,339 to Ward et al.

U.S. Pat. No. 6,117,217 to Jones removes gaseous ammonia from a pumped liquid stream. However, it separates out the gas phase after the pump inlet rather than before the inlet. This method requires a particular pump design. Many pump designs would become vapor locked with a mixed phase feed of gas and liquid as described in the patent.

SUMMARY OF THE INVENTION

The method and apparatus of the present invention supplies liquid anhydrous ammonia to a pump or other flow control system which is part of a system for application of agricultural ammonia fertilizer. This invention uses a gas separation chamber to remove vapor generated by friction in the flow path from a storage tank containing saturated anhydrous ammonia. Additionally, liquid ammonia in the separation chamber creates a static head pressure. The difference in height between the inlet near the top of the chamber and the outlet at the bottom causes the static head pressure differential. This static head assures pure liquid at the bottom since absolute pressure there exceeds saturation pressure. As a result, the liquid feed stream to the pump or other flow control system is free of ammonia vapor.

Liquid anhydrous ammonia in the storage tank is a saturated liquid at its vaporization temperature. As the liquid stream passes through valves, fittings and a connecting hose to the applicator system it experiences a pressure loss due to friction in the hose. Because of the lowered pressure some liquid ammonia vaporizes to cool the liquid to the saturation temperature associated with that lower pressure. This changes the liquid stream into a mixture of liquid and gaseous phases. The greater the pressure drop, the greater is the ratio of gas to liquid. Anecdotal evidence suggests that application rates near 600 lbs/hr of anhydrous causes temperature drop of less than 1° F. using 1¼" inside diameter connecting hoses. Smaller hoses and fittings would increase the temperature drop as would higher rates of application. Assuming a 1° F. drop from the storage tank to the separation chamber, approximately 0.2% by weight of ammonia gas would be created. This is about 25% by volume.

The gas separation chamber is composed of three sections. Past the feed entry is a quieting section which allows gaseous bubbles to rise out of the liquid stream. This section has a larger diameter to provide increased volume to reduce fluid velocity. Above the quieting section is head space for collection and separation of gaseous ammonia. This space has enough volume to allow liquid level to rise and fall as the gaseous ammonia is metered out of the chamber. Below the quieting section is a reduced diameter stand pipe which creates static head pressure additive to the inlet pressure. The smaller diameter of the stand pipe section reduces the amount of anhydrous liquid stored in the chamber. The diameter need only be big enough to prevent a significant loss of pressure due to fluid friction.

Liquid anhydrous ammonia in the storage tank passes through piping, a hose, and several fittings including valves, quick connecting coupling, and break away coupling. Upon entry into the chamber velocity of the incoming liquid stream is reduced such that entrained gas bubbles have time to rise to the top of the chamber. Gaseous ammonia collects above the feed entry to the chamber. A gas eliminator is located at the top of the chamber to vent gaseous ammonia from the container while sealing against flow of liquid. The gaseous ammonia passes through a shut off valve to an exhaust hose which is connected to one of the soil injection knives. Liquid ammonia flows down the stand pipe to the bottom outlet of the chamber. It then enters an elbow and connects to the inlet of the flow control system.

BRIEF DESCRIPTION OF DRAWINGS

These and other objects, features and advantages of this invention will become readily apparent in view of the following detailed description of the preferred embodiments and best mode, appended claims and accompanying drawings, in which:

DETAILED DESCRIPTION OF THE PREFERRED EMBODIMENTS

Figure 1:
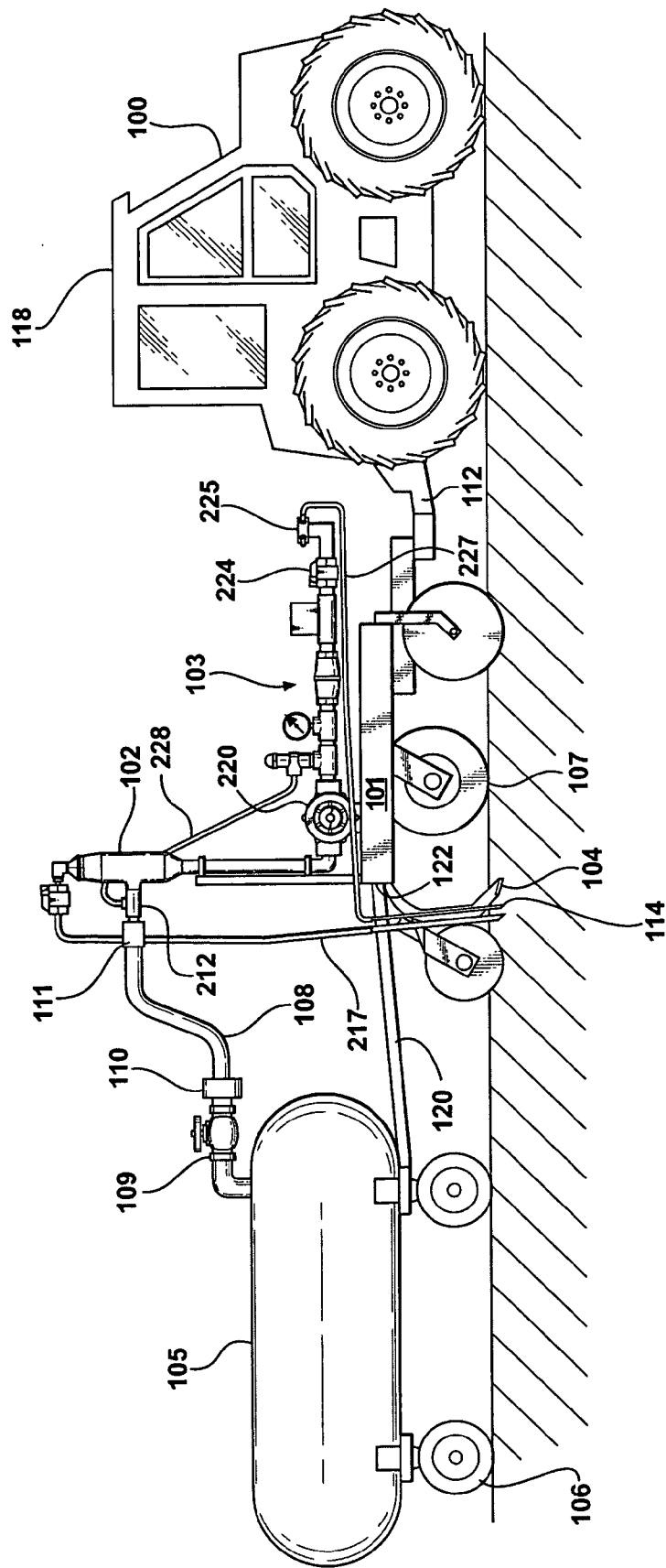
FIG. 1 is a side elevation of the apparatus of the present invention being pulled behind a tow vehicle.

Referring first to FIG. 1, the apparatus of the present invention is shown being pulled behind a tow vehicle 100 which could be a tractor, truck, or the like. The apparatus includes a toolbar applicator frame 101 which supports a separation chamber 102, a flow control system 103 which may include a pump 220, a hydraulically operated shut off valve 224, a distribution manifold 225, flow control orifices 226, a plurality of soil cutting knives 104, and a storage tank 105 supported on a plurality of wheels 106 and towed behind the toolbar applicator frame 101. The toolbar applicator frame 101 itself is supported on a plurality of wheels 107 and has a tongue 116 that is pivotally connected to a hitch 112 on the rear of the tow vehicle 100. In the preferred embodiment, the toolbar applicator frame 101 is a Progressive series 1300 NH3 Toolbar, manufactured by Progressive Farm Products, Inc. of Hudson, Ill. It is configured by Progressive for "strip till" ammonia application. Multiple knives 104 are suspended from the frame 101, with there being typically 8, 12, or 16 of the knives 104 attached to a toolbar applicator frame 101, which is adapted to raise or lower the knives 104 into the soil. Each knife 104 includes at least one injector nozzle 114 through which the ammonia can be emitted into the soil when the knife 104 is lowered into the soil.

The storage tank 105 is a pressurized tank that is commercially available and retains a predetermined quantity of fertilizer which may be, by way of illustration, anhydrous ammonia. The storage tank 105 is on a trailer that also has a tongue 120 that is pivotally connected to a hitch 122 on the toolbar applicator frame 101.

Figure 2:
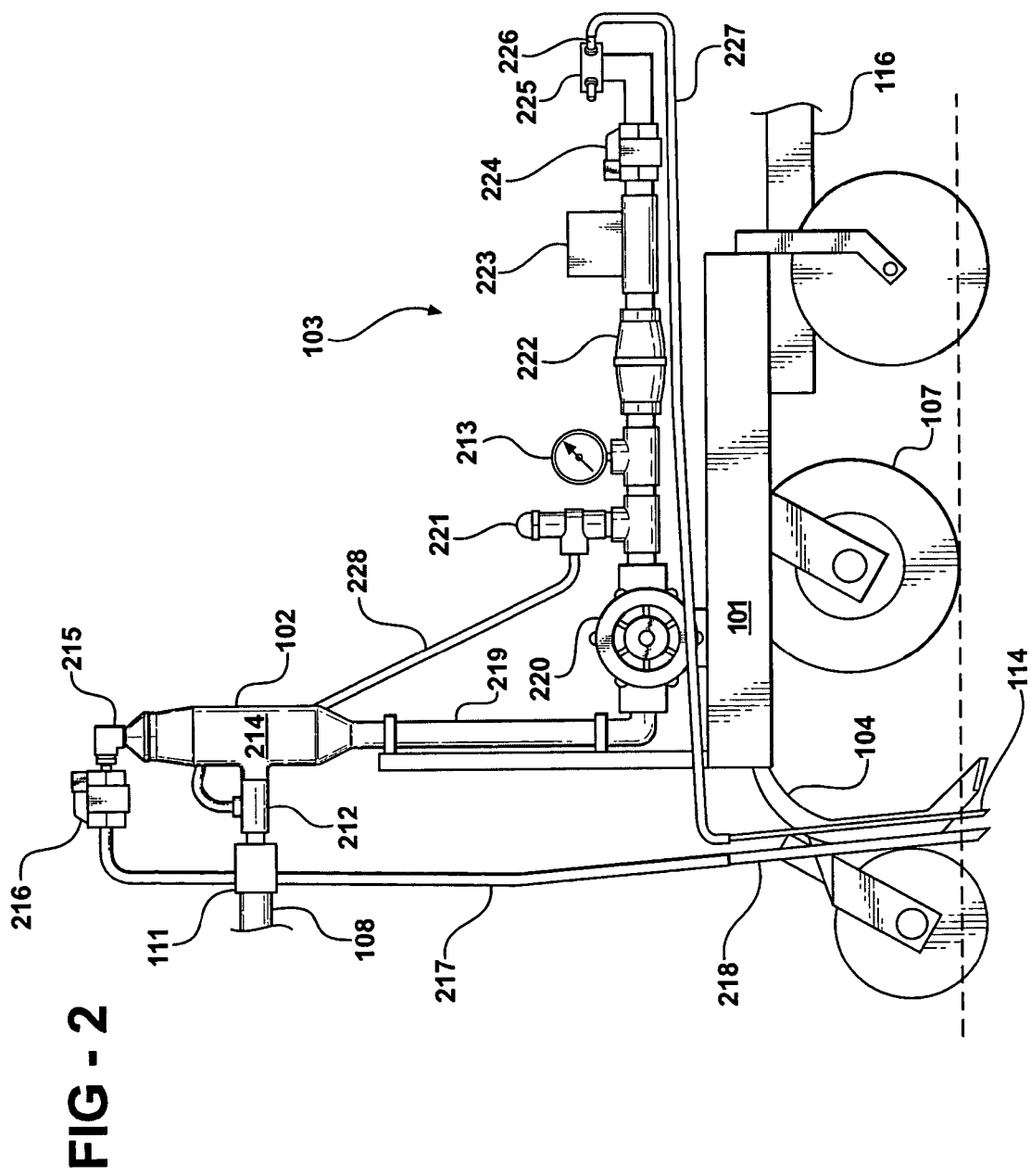
FIG. 2 is a fragmentary side elevation of the apparatus of the present invention.
Figure 3:
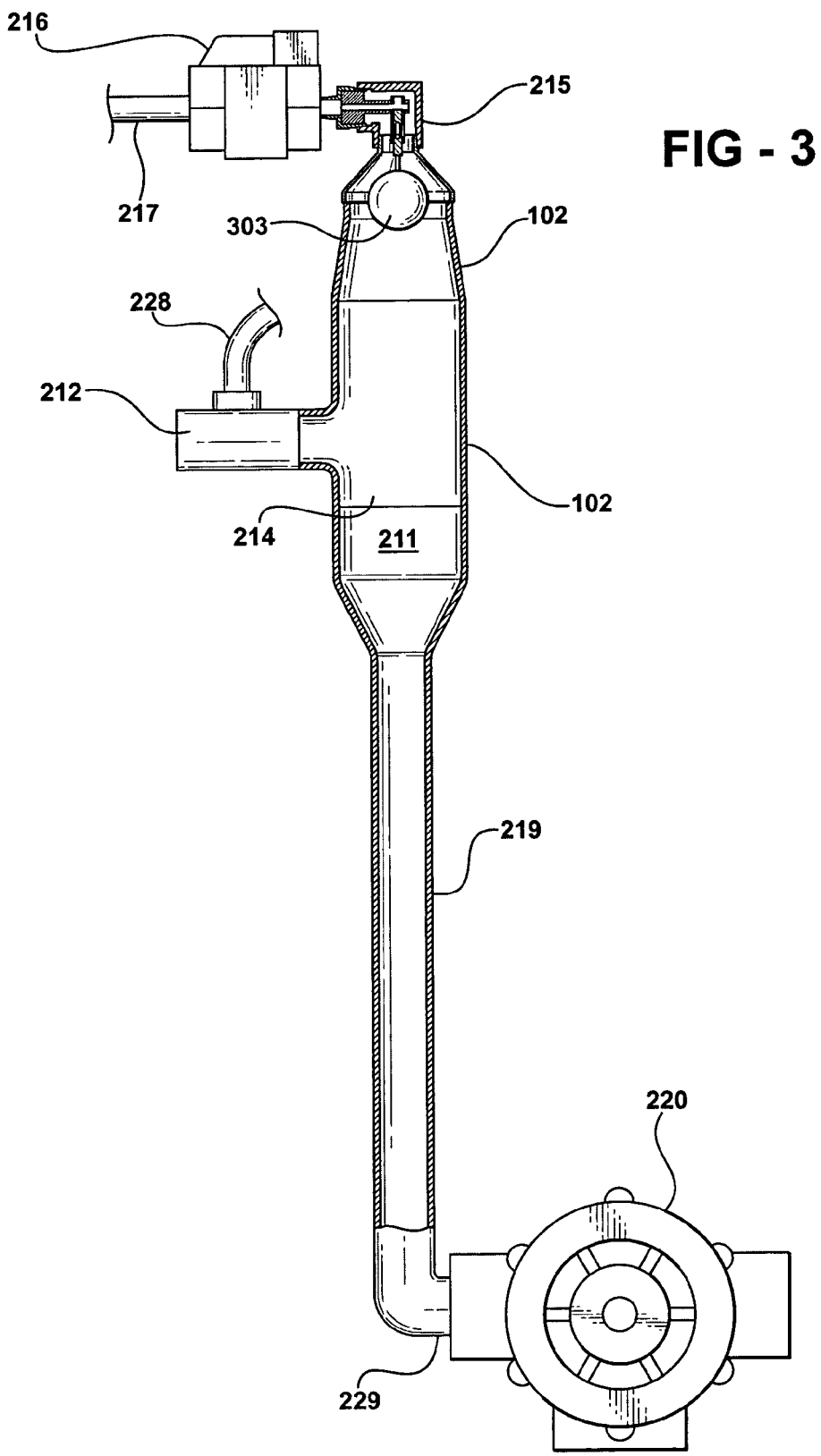
FIG. 3 is a cutaway view of the separation chamber.
Figure 4:
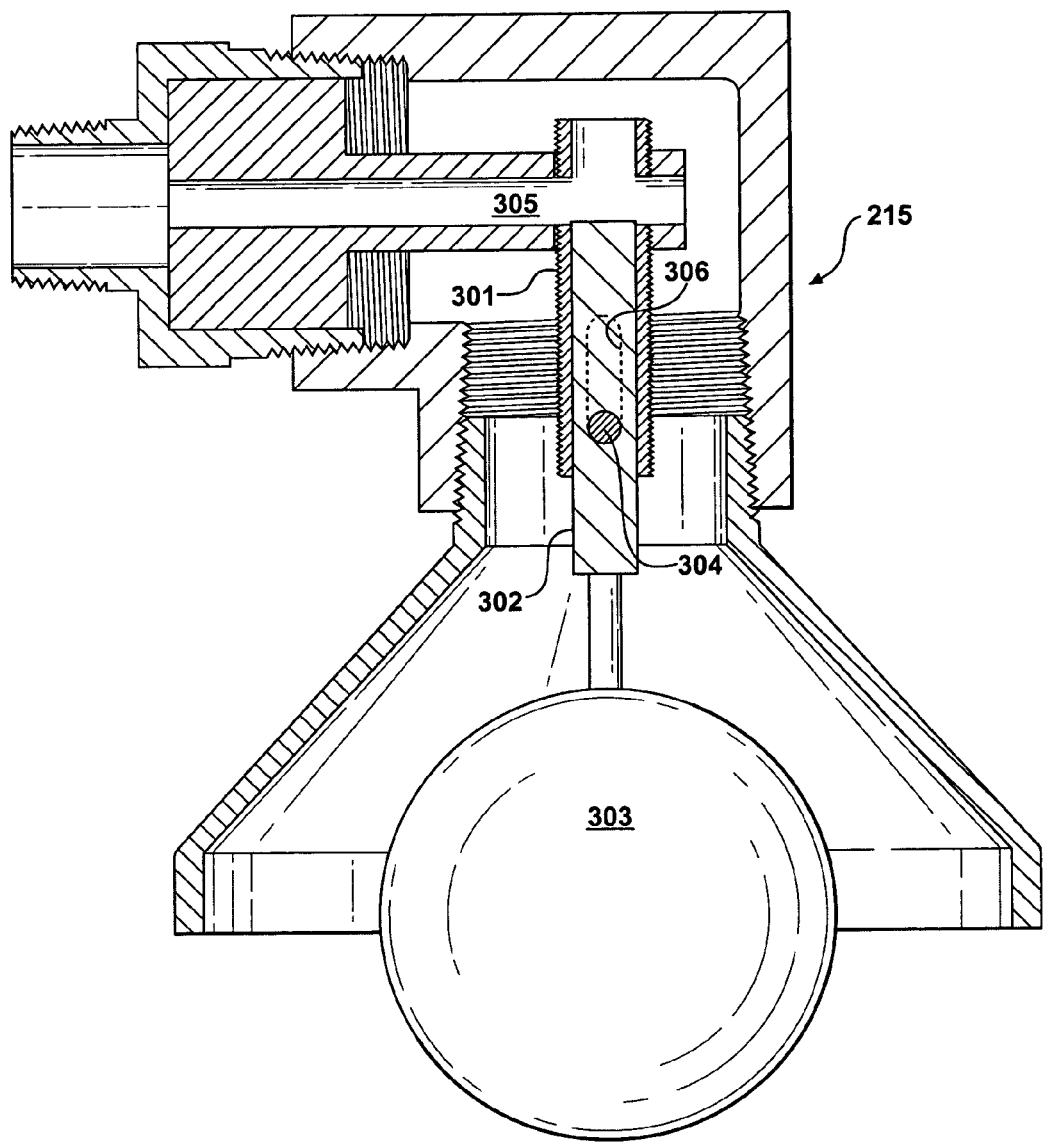
FIG. 4 is an enlarged vertical sectional view of a float controlled gas eliminator valve with a portion of the spool broken away.

FIGS. 1–4 depict the apparatus of the present invention. As shown clearly in FIG. 1, a main delivery or exit hose 108 passes from the supply tank after an appropriate manually-operable shutoff valve 109 and a quick connect coupling 110 to a breakaway coupling 111 on the toolbar applicator frame 101. The main delivery hose 108 would be, by way of example, a 1.25" internal diameter ("I.D.") reinforced neoprene-lined hose. The breakaway coupling 111 connects at an entry point 212 (as shown in FIG. 2) to the separation chamber 102 where ammonia vapor is separated in a quieting section 214 from liquid ammonia.

Vapor rises to the top of the separation chamber quieting section 214 and exits through a float operated gas vent valve body 215. Gas vent valves are commercially available. However, the valve described below is a new design. Typically, the float operates on a hinged lever which closes an orifice located part way between the float and the hinge. When the force exerted by the pressure difference across the orifice exceeds the net force caused by the weight of the float acting on its lever arm, the valve will stick in a closed position, allowing no gas to pass. Typically, this problem is solved by the use of a very small orifice. However, a small orifice is typically inadequate to exhaust the total gas generated. This causes gas to build up in the separation chamber until it finally reaches the pump inlet, starving the pump. The valve design described here avoids use of an orifice. With this design there is no pressure differential creating a force to hold the valve in its closed position. The valve consists of a housing 301, a spool 302, and a float 303. When the level of liquid ammonia drops, the float 303 drops also. The spool 302 is rigidly attached to the float 303 and moves as the level of liquid ammonia changes. Travel of the spool 302 is limited by the drive pin 304 through the spool which bottoms at the end of slot 306 in the housing 301. In this position, the top of the spool 302 is below the gas exit passage 305 so gas flows through the exit passage 305 and out of the separation chamber 214. As gas leaves the separation chamber 214 the liquid level rises, raising the float 303. As the float 303 rises, it raises the spool to cover the exit passage 305 stopping flow. This prevents liquid ammonia from exiting the separation chamber.

From the exit passage 305 the gas then passes through a hydraulically operated shutoff valve 216, then through a low pressure hose 217 to a tube 218 on one of the injection knives 104. This gas has been created by a fluid friction between the storage tank 105 and the separation chamber 214.

Liquid ammonia flows down inside the separation chamber 102 through a static head pipe 219 and exits the chamber to a suitable flow control system 103. It is possible to create a vortex in the separation chamber 102 whereby ammonia gas can be conveyed to the inlet to the flow control system. To prevent a vortex, a baffle 211 is placed in the quieting zone 214 below the inlet 212 to the separation chamber 102. An increase in liquid pressure at the exit 229 of the separation chamber 102 is caused by the weight of liquid ammonia in the quieting zone 214 and the static head pipe or standpipe 219. This pressure increase raises the pressure of the liquid above saturation pressure. The quiet section or quiet zone 214 has an area perpendicular to a flow of liquid ammonia through the quieting section that is at least two times the entry passage 212 area. The standpipe 219 has a standpipe ammonia flow path cross-section area that is smaller than the quieting section area.

The flow control system 103 would preferably include a positive displacement pump 220, such as of the type manufactured under model 1502 or model 7560 by Hypro Corporation of New Brighton, Minn. In the preferred embodiment, the pump 220 is driven by a Char-Lynn hydraulic motor, model 101-1700, using tractor hydraulics. Following the pump 220 is a side stream with a pressure relief valve 221 which limits over pressurization of the system downstream from the pump 220. Any effluent from the pressure relief valve 221 flows through a hose 228 to the inlet 212 of the separation chamber 102. Pressure is monitored by a pressure gauge 213. A flow sensor 222 is connected to a console/controller in the cab of the tow vehicle 100 so that the operator of the tow vehicle 100 can monitor and control the flow of ammonia through a servo valve 223. Following the servo valve 223 the liquid ammonia flows to one or more hydraulically operated shut off valves 224. After each shut off valve 224 is a manifold exit, to each knife 104, that includes an orifice 226. Each orifice 226 creates a backpressure on the flow controls system 103, maintaining the ammonia at a pressure above its saturation pressure. The orifices 226 provide equal flow to each knife line. Flexible hoses 227 connect these lines from the manifold 225 to the knives 104.

The hydraulically operated shut off valves, 216 and 224, are typically operated by the hydraulic circuit which lifts the applicator frame 101 at the end of a row. This reduces escape of ammonia vapor to a minimal amount. At the start of a new row, the system has not been depleted of liquid ammonia. It requires much less time to reach equilibrium at the start of a new row.

The ammonia in storage tank 105 is saturated. Liquid ammonia is in the bottom of the tank 105. Ammonia gas in the top of the tank raises the pressure in the tank until the system is stabilized. If the temperature of the ammonia increases, the quantity of ammonia gas increases and the pressure in the tank 105 increases until the system is stabilized at the higher temperature. If the temperature of ammonia in the tank 105 decreases, some gas becomes liquid, the pressure in the tank decreases and the system stabilized at the decreased temperature.

The pressure in the storage tank 105 is sufficient to force liquid ammonia into the open bottom end of a vertical pipe in the storage tank 105 and through the delivery hose 108. The liquid ammonia enters the separation chamber 102 and any gas that is formed rises to the top of the chamber. Gas forms due to friction as stated above. The friction due to flow of ammonia through the system results in a pressure drop. As the pressure drops, the liquid ammonia boils and cools to a new saturated condition with mixed liquid and gaseous states. The gas vent valve 215 removes ammonia gas to allow continued flow from the tank 105.

Pumps such as the pump 220 reduce pressure on their inlet side. If the pressure on the inlet side of the pump is reduced below the saturation pressure, ammonia gas bubbles will be formed. Such gas bubbles can vapor lock the pump 220. Any gas passing through the flow sensor 222 will adversely affect the accuracy of the flow sensor 222 and may also result in non-uniform flow from the manifold 225. The head pipe 219 has sufficient vertical height to create a head and ensure that the pressure of the fluid at the inlet to the pump remains above the saturation pressure. The elevated pressure ensures that no gas passes through the flow sensor 222 or through the orifices 226. All of the liquid that passes through one orifice 226 is injected through one knife 104. The vertical distance from the entry point 212 down to the pump inlet at separation chamber exit 229 was 44" in one test unit that performed well. However, the required static head depends upon ambient temperature, pump capacity, ammonia flow rate, pipe diameters, pipe lengths and obstructions to fluid flow. The required static head will vary from the 44" depending upon these factors. Other factors, that are not listed above, may also change static head requirements. The 44" static head is believed to be adequate over a relatively large temperature range with the apparatus tested.

The formation of gas in the hoses 227 is generally not a serious problem. The desired quantity of ammonia will be delivered to the crop row. It is understood that the disclosed embodiment is representative of a presently preferred form of the invention and that others that accomplish the same function are incorporated herein within the scope of any ultimately allowed patent claims.

I claim:

1. An anhydrous ammonia fertilizer flow control apparatus comprising;
    a separation chamber, for separating gaseous ammonia from liquid ammonia including a head space in a top end of a separation chamber, a quieting section in the separation chamber below the top end, and a stand pipe;
    the top end of the separation chamber includes a gaseous ammonia discharge valve that is open to discharge gaseous ammonia from the separation chamber and that is closed in response to the level of liquid ammonia reaching a selected liquid height within the separation chamber;
    the quieting section includes an entry passage, with an entry passage area transverse to a flow direction, for receiving a mixture of gaseous ammonia and liquid ammonia from an ammonia storage tank and wherein the quieting section has a quieting section area, perpendicular to a flow of liquid ammonia through the quieting section, that is at least two times the entry passage area to slow the velocity of gaseous ammonia and liquid ammonia and permit the gaseous ammonia to separate from liquid ammonia and rise into the head space;
    the stand pipe includes a stand pipe upper end connected to a downstream end of the quieting section, a stand pipe lower end and a stand pipe ammonia exit passage spaced below the head space; and
    a liquid ammonia pump connected to the standpipe ammonia exit passage.

2. An anhydrous ammonia fertilizer flow control apparatus, as set forth in claim 1, wherein the gaseous ammonia discharge valve includes a valve body, a spool housing attached to the valve body and having a spool passage with an open first passage end, an open second passage end and a gas exit passage intersecting the spool passage;
    a spool slidably mounted in the spool passage for sliding movement between an open position in which the gas exit passage is open and a closed position in which the gas exit passage is closed; and
    a float connected to the spool and operable to slide the spool to a closed position in response to a decrease in the volume of the gas in the headspace.

3. An anhydrous ammonia fertilizer control apparatus, as set forth in claim 2, wherein the float is connected directly to the spool and the spool moves with the float as the level of liquid ammonia in the separation chamber moves up and down.

4. An anhydrous ammonia fertilizer flow control apparatus, as set forth in claim 3, wherein the spool slides in the spool passage along a generally vertical path.

5. An anhydrous ammonia fertilizer flow control apparatus, as set forth in claim 1, including a manifold attached to a pump outlet of the liquid ammonia pump and a plurality of flexible hoses each of which is connected to the manifold and to one of a plurality of nozzles that inject ammonia into the ground.

6. An anhydrous ammonia fertilizer flow control apparatus, as set forth in claim 5, wherein each of the plurality of nozzles is mounted on an earth working tool that forms a slot in the ground.

7. An anhydrous ammonia fertilizer flow control apparatus, as set forth in claim 6, wherein the earth working tool is a knife mounted on an applicator frame.

8. An anhydrous ammonia fertilizer flow control apparatus, as set forth in claim 1, wherein the stand pipe has a stand pipe ammonia flow path cross-section area that is smaller than the quieting section area.

9. An anhydrous ammonia fertilizer apparatus comprising an applicator frame adapted to move across a farm field;
   a plurality of soil working tools mounted on the applicator frame;
   a gaseous ammonia separation chamber attached to the applicator frame and including a head space, in a top end of the gaseous ammonia separation chamber, a quieting section and a stand pipe;
   a gaseous ammonia discharge valve, mounted on the top end of the gaseous ammonia separation chamber, that is opened to discharge ammonia gas from the gaseous ammonia separation chamber and that is closed in response to the level of liquid ammonia reaching a selected liquid height within the separation chamber;
   an entry passage, for receiving a mixture of gaseous ammonia and liquid ammonia from an ammonia storage tank, through a quieting section wall, and wherein the quieting section has a diameter that is at least twice the diameter of the entry passage;
   a stand pipe upper end attached to a discharge end of the quieting section and a stand pipe discharge opening through a stand pipe lower end and wherein the stand pipe discharge opening is spaced below the head space a distance sufficient to create a static head that maintains an ammonia pressure at the discharge opening that is above the anhydrous ammonia saturation pressure;
   an ammonia liquid pump connected to the standpipe discharge opening;
   a manifold attached to a pump discharge of the ammonia liquid pump for dividing pump discharge into a plurality of separate ammonia streams with substantially equal flow rates; and
   a plurality of hoses each having one end connected to the manifold and a discharge end connected to a nozzle supported by the applicator frame adjacent to one of the soil working tools.

10. An anhydrous ammonia fertilizer apparatus, as set forth in claim 9, wherein ammonia gas discharged from the gaseous ammonia discharge valve is conveyed by a gas conveyor hose attached to a valve discharge port and injected into the ground through a gas nozzle supported by the applicator frame adjacent to one of the soil working tools.

11. A method of applying anhydrous ammonia fertilizer to farm fields comprising:
   supplying saturated ammonia in a storage tank;
   employing the pressure generated by the saturated ammonia at a vaporization temperature to force ammonia gas and ammonia liquid into a separation chamber;
   separating ammonia gas from the mixture of ammonia gas and liquid in the separation chamber;
   removing ammonia gas from the separation chamber to reduce pressure in the separation chamber and to control a gas head volume in the separation chamber;
   employing an ammonia liquid head to maintain a pump inlet pressure of above a saturation pressure of the ammonia;
   pumping ammonia from the pump inlet to a manifold and metering the ammonia from the manifold through orifices;
   conveying the ammonia from the manifold through flexible hoses to a plurality of ammonia injection nozzles; and
   injecting the ammonia into soil.

\* \* \* \* \*